Sept. 25, 1956  H. F. MAYER  2,764,684
ELECTRONIC CONTROL CIRCUIT
Filed Dec. 4, 1950
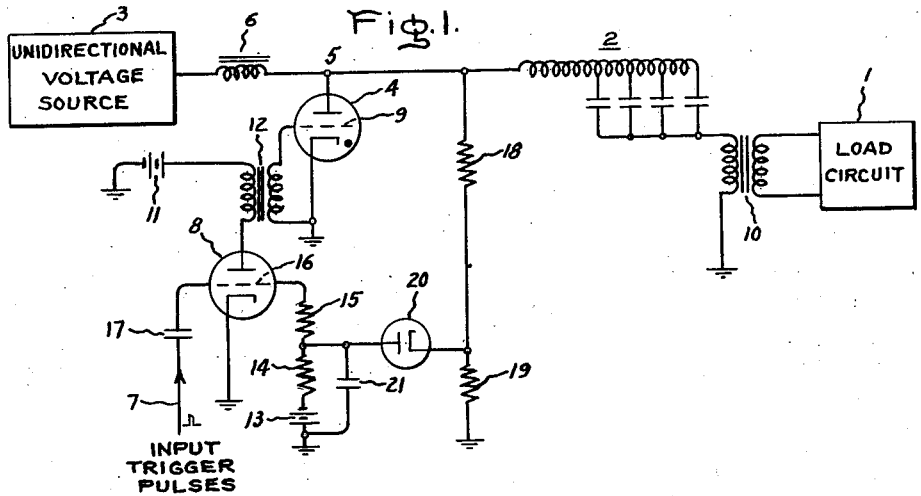
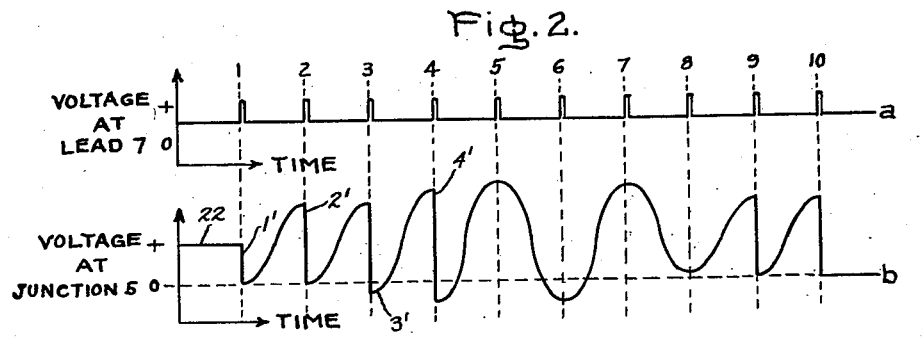
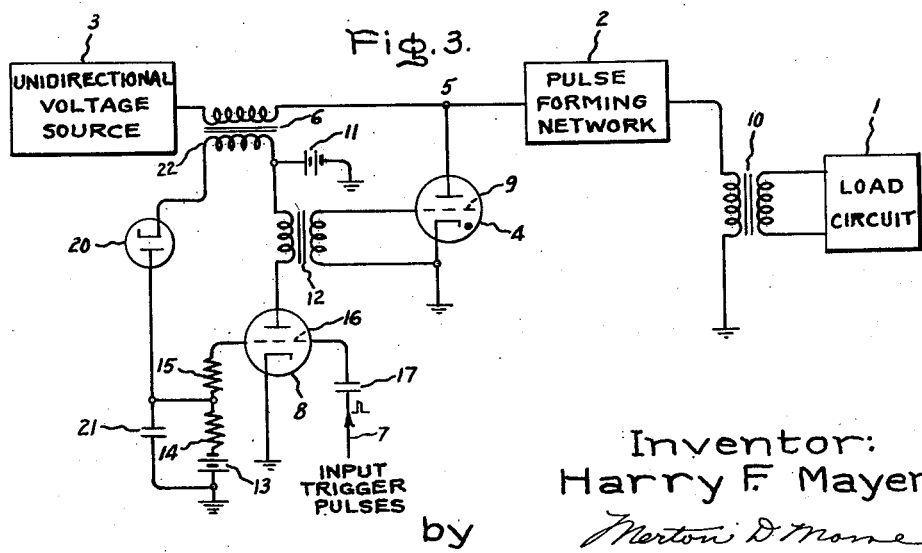
Inventor:
Harry F. Mayer,
by Morton D. Morse
His Attorney.

United States Patent Office 2,764,684
Patented Sept. 25, 1956

2,764,684

ELECTRONIC CONTROL CIRCUIT

Harry F. Mayer, Baldwinsville, N. Y., assignor to General Electric Company, a corporation of New York Application December 4, 1950, Serial No. 198,968

7 Claims. (Cl. 250—36)

This invention relates generally to electrical control circuits and more particularly to arrangements providing a predetermined control action in response to faults occurring in an electrical load circuit.

In providing protective action for electrical circuits subject to instabilities manifested as abnormal electrical signal conditions such as voltage, current or frequency deviations from a given norm, a system which is reliable, flexible, fast acting, as well as simple is desired. A protective problem oftentimes encountered when a load circuit is energized from a high voltage source involves de-energization of the load circuit harboring an instability in response to the occurrence of a fault followed by subsequent re-energization. This recurrent energization and de-energization of the load circuit continues until a predetermined number of faults have been detected at which time the load circuit is permanently disconnected from the power source.

An automatic, fast action reclosing circuit of this sort is useful in protecting high frequency magnetron oscillators from undesirable impedance changes occurring in the magnetron circuit. These usually manifest themselves as a very low impedance resulting from a gas discharge or sparking within the magnetron or a very high impedance due to failure of the magnetron to oscillate in the proper manner, commonly referred to as mode changing. Either of these events may occur only once or twice per million pulses but when such an event occurs repeatedly, destructive voltage and current surges are reflected in the energizing circuits for the magnetron.

An object of this invention is to provide an improved protective arrangement against electrical circuit instabilities.

Another object of the invention is to provide an improved protective arrangement for detecting instability occurring in a load network energized from a power source and for de-energizing the load circuit upon persistence of the instability.

Another object of the invention is to provide an improved reclosing circuit for a magnetron oscillator.

Another object of the invention is to provide a novel protective arrangement for halting operation of the switching apparatus feeding the output of a pulser network to a magnetron load circuit upon the occurrence of an instability in the magnetron circuit.

In accordance with one preferred embodiment of the invention, applicable to the operation of a magnetron load circuit from a pulse forming network, repeated instabilities in the magnetron load circuit reflected back through the pulse forming network in the form of residual charges are integrated by means of a storage circuit. The output of the storage circuit upon reaching a predetermined level delivers a control signal which is employed to halt energization of the load circuit from the pulse forming network. The magnetron load circuit is maintained inoperative for a predetermined time interval determined by the time constant of the storage circuit.

The novel features which I believe characteristic of my invention are set forth with particularity in the appended claims. My invention both as to its organization and method of operation together with further objects and advantages thereof may best be understood by reference to the following description taken in connection with the accompanying drawings in which Fig. 1 shows in circuit diagram form one embodiment of the invention applicable to a magnetron firing circuit, Fig. 2 illustrates graphically the voltage wave form developed in the pulse forming network associated with the magnetron firing circuit and Fig. 3 shows in circuit diagram form another improved embodiment of the invention.

Referring to Fig. 1, there is shown a load circuit 1, such as a magnetron oscillator, energized from a pulse forming network 2. Network 2 is charged cyclically to a high unidirectional potential by source 3, and then discharged under the control of the gaseous discharge device 4, operating as a switch. In discharging through the gaseous discharge path of switch device 4, the network 2 causes a substantially square wave of high voltage to be induced into the magnetron load circuit 1 by transformer 10 thereby energizing the magnetron load circuit and causing it to operate.

Since the magnetron load circuit is subject to instability as previously outlined, some form of protection is desirable to avoid any damage to the associated magnetron energizing circuits. Under normal operation the load impedance of the magnetron circuit is reasonably well matched with the impedance of the pulse forming network such that the charged network delivers substantially all its energy to the magnetron load circuit 1 during operation of switch device 4. During a first cycle of operation of the magnetron energizing circuits, the network 2 charges to the full unidirectional potential available at junction 5 over the charging reactor 6. By rendering the switch device 4 conductive, the network 2 discharges to zero voltage. Thereupon, the switch device 4 becomes non-conductive permitting the network to recharge. Reactor 6 is arranged to be resonant with the impedance of the pulse forming network so that the recharge is to twice the voltage available from source 3, at which time it is again completely discharged; succeeding cycles being the same. During sparking of the magnetron, however, its impedance is materially reduced. The effect of this reduced load impedance results in a mismatch of the magnetron load circuit and the pulse forming network with the result that the pulse forming network 2 is left with a residual negative charge and the following charging cycle is to a voltage of more than twice the supply voltage. This overvoltage coming immediately after a spark over will generally cause the spark to repeat and the next charging cycle will carry the network to a still higher voltage. Thus, there is created a runaway condition which heavily overloads the power supply, the network and the associated electron discharge devices.

To avoid the runaway condition, a protective circuit is provided which interrupts the discharge portion of the operating cycle before any damage is done, allowing the magnetron circuit to recover to a stable condition before normal operation is resumed. The protective circuit is so arranged that mismatch in the load causes the switch device 4 to be rendered inoperative, thereby halting energization of the magnetron load circuit. After a time interval determined by time constants in the protective circuit the switch device 4 is once again rendered operative.

Referring to Fig. 1 in detail, the switch device 4, comprising a gaseous discharge device, has its gaseous discharge path connected across the pulse forming network 2 and is normally arranged to be non-conductive. Cyclically, incoming trigger pulses available at lead 7 render switch device 4 conductive to discharge the pulse forming network 2 and thereby energize the magnetron load circuit 1. To control conduction of switch device 4, an electron discharge device 8 is employed. Electron discharge device 8 has its electron discharge path energized from source of potential 11 through the primary winding of coupling transformer 12. Device 8 is normally held nonconductive by the application of a negative bias from source 13 over resistors 14 and 15 to its grid electrode 16. Upon application of a positive going trigger pulse over lead 7, and coupling condenser 17, to the grid electrode 16, device 8 is rendered conductive. The sudden current flow through device 8 and the primary winding of transformer 12 induces a positive going voltage pulse in the secondary winding connected between the grid electrode 9 of device 4 and ground. Thereupon device 4 is rendered conductive to discharge the pulse forming network 2 through its gaseous discharge path. This results in a high voltage pulse being induced in the secondary winding of transformer 10 to energize the load circuit 1. After discharge of the pulse forming network, gaseous discharge device 4 again ceases to conduct, and, since the incoming positive trigger available over lead 7 has since disappeared, remains nonconductive thereby permitting the pulse forming network to charge to twice the average unidirectional potential of terminal 5. Subsequent pulsing of the magnetron circuit is therefore to twice the potential of terminal 5.

In the event that the impedance of the magnetron load circuit falls below normal, due for example to sparking, the impedance match between the load circuit and the pulse forming network no longer exists and instead of having all the energy stored in the network 2 absorbed by the load circuit 1, a residual charge remains in the pulse forming network. This residual charge, in the form of a negative voltage, is developed across the voltage divider comprising resistors 18 and 19. The portion of this negative going voltage developed across resistor 19 is applied through diode 20 to charge the time constant circuit comprising condenser 21 and resistance 14 to a negative voltage. This latter potential is added to the negative bias of battery 13 at grid 16 and maintains device 8 in a cutoff condition for a given time interval. During this time interval, positive input trigger pulses over lead 7 are ineffective to cause device 8 to conduct. The duration of this interval is determined by the time constant of resistor 14 and condenser 21 which is normally adjusted to keep device 8 cut off for four to eight input trigger pulses upon the occurrence of a fault in the load circuit. Thus, with device 8 held cut off, device 4 is also maintained cut off, thereby preventing further energization of the load circuit 1. After the negative cutoff bias provided by the charge developed in the condenser of the time constant circuit has substantially dissipated itself in the resistance 14, the incoming trigger pulses over lead 7 are once again effective to cause device 8 to conduct current, and a positive voltage is induced in the secondary winding of transformer 12 and applied to grid 9 of device 4. This causes device 4 to conduct and discharge the pulse forming network into the load circuit 1.

Referring to Fig. 2, there is disclosed the nature of the runaway voltage condition and the effectiveness of applicant's arrangement in overcoming this difficulty. Graph *a* illustrates the trigger pulses available over lead 7 for firing the switch device 4 and causing the pulse network 2 to be discharged into the load circuit 1. Graph *b* illustrates the charging and discharging voltage of the pulse forming network developed at junction 5.

Thus, referring to Graph *b* it is seen that the pulse forming network, originally charged to the full potential of source 3, as indicated at 22, is discharged to zero voltage as indicated at 1' upon the arrival of the first trigger pulse 1 and then immediately charges in a sinusoidal fashion to twice the potential of source 3 as indicated at 2'. The second trigger pulse 2 again causes the pulse forming network to discharge to zero voltage, and then to charge up to twice the potential of source 3. However, if it is assumed that the discharge of network 2 with the arrival of the third trigger pulse produces sparking in the magnetron, the load impedance is effectively decreased. The resulting mismatch causes the pulse forming network to retain a residual negative voltage as indicated at 3', and the following charging cycle is to a voltage of more than twice the supply voltage as indicated at 4'. This overvoltage coming immediately after spark over will generally cause the spark to repeat as previously mentioned, thereby endangering the associated equipment. However, in accordance with applicant's invention, the negative residual charge developed in the pulse forming network 2, as the result of two consecutive spark overs, causes the switch device 4 to be rendered inoperative for the next four succeeding trigger pulses 5, 6, 7 and 8, thereby preventing discharge of the pulse forming network as shown in graph *b*. Thereafter, the trigger pulses are once again rendered effective in discharging the pulse forming network. Graph *b* indicates that upon the arrival of the ninth trigger pulse the magnetron is stabilized and proper operation is established.

Although the circuit arrangement of Fig. 1 has been found to operate successfuly even when two or three cycles of faulty operation are required to make the device 8 cut off, it would be desirable to make the cutoff in some instances occur on the first cycle. They may be arranged by decreasing the time constant of the charging circuit for condenser 21 and resistance 14. Unfortunately, resistances 18 and 19, forming part of the charging circuit, are preferably made large in order that they do not load the switching circuits excessively. However, if they are too large then the charging time constant of resistance 14 and condenser 21 may be so great that the bias of device 8 does not reach its cutoff value on the first faulty cycle. The circuit arrangement of Fig. 3 is designed to remedy this.

The circuit arrangement of Fig. 3 is similar in many respects to that shown in Fig. 1 and hence like functioning elements have been assigned the same reference numerals. Instead of employing a resistor voltage divider for coupling the residual charge developed in the pulse forming network upon a misfiring of the magnetron load circuit 1, a secondary winding 22 associated with the charging reactor 6 is employed. Upon discharge of the pulse forming network 2, a voltage, corresponding to the residual voltage charge left in the network as a result of the magnetron spark over, is induced in the secondary winding 22, and applied through the reverse charging diode 20 to the time constant or storage circuit comprising elements 14 and 21. This voltage immediately charges up the storage circuit to a high enough negative potential to cut off device 8 because of its grid connection to the storage circuit over resistance 15. The cut off is for a period determined by the time constant of resistor 21 and condenser 14. Thus, device 8 is cut off for a desired period upon the first occurrence of a sparking in the magnetron load circuit. With device 8 cut off in this manner, the positive input trigger pulses available over lead 7 are unable to cause conduction of device 8. With device 8 cut off, device 4 remains cut off thereby preventing discharge of the pulse forming network under control of the trigger pulses. After the initial charge developed in the time constant circuit comprising resistor 14 and condenser 21 has leaked off, device 8 is once again able to be rendered conductive by trigger signals applied over lead 7. The advantage of the arrangement shown in Fig. 3 over that shown in Fig. 1 is that the charging impedance of the secondary winding of transformer 22 is much lower than the charging impedance of the voltage divider comprising resistors 18 and 19 shown in Fig. 1 resulting in a more rapid build up of a cut-off bias in the storage circuit.

While specific embodiments have been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. In a pulse-forming system, a source of unidirectional voltage, a load, an oscillatory storage network connected between said source and said load and adapted to be charged from said source, a source of recurrent pulses, means responsive to each of said recurrent pulses to discharge said network, whereby a pulse of current is supplied by said network to said load, said load having an impedance which is subject to reduction in response to said pulses causing a residual of potential to appear in said network after operation of said discharge which residual of potential increases over a series of said pulses, and means to prevent such increase of potential, said means comprising means responsive to said residual of potential to disable said discharge means for a period greater than the interval between pulses and sufficient to permit normal voltage on said network to be restored before said network is again discharged by said discharge means.

2. In a pulse-forming system, a magnetron generator, a source of operating potential, an oscillatory storage network connected between said source and said magnetron generator and adapted to be charged from said source, a source of recurrent pulses, means responsive to each of said recurrent pulses to discharge said network through said magnetron generator whereby oscillations are generated in said magnetron, the normal impedance of said magnetron normally being so related to the impedance of said network that the entire energy stored therein is discharged in response to each of said recurrent pulses, said magnetron generator being subject to abnormal reductions in impedance which prevent complete discharge of said network whereby a residual of potential appears which residual of potential increases over a period of successive pulses, and means responsive to said abnormal impedance reductions to disable said discharge means having a period greater than the interval between pulses sufficient to permit normal voltage conditions on said network to be restored before said network is again discharged.

3. In a pulse-forming system, a source of unidirectional voltage, a load, a storage network including a plurality of series connected inductances and a plurality of shunt capacitances connected between said source and said load and adapted to be charged from said source, a source of recurrent pulses, means responsive to each of said recurrent pulses to discharge said network, whereby a pulse of current is supplied by said network to said load, said load having an impedance which is subject to reduction in response to said pulses causing a residual of potential to appear in said network after operation of said discharge residual of potential increases over a series of said pulses, and means to prevent such increase of potential, said means comprising means responsive to said residual to disable said discharge means for a period greater than the interval between pulses and sufficient to permit normal voltage on said network to be restored before said network is again discharged by said discharging means.

4. In a pulse-forming system, a source of unidirectional voltage, a load, an oscillatory storage network connected between said source and said load and adapted to be charged from said source, a transformer including a primary winding interposed in series relation between said source and said network and operative to cause said network to charge to a potential greater than that of said source, a source of recurrent pulses, means responsive to each of said recurrent pulses to discharge said network, whereby a pulse of current is supplied by said network to said load, said load having an impedance which is subject to reduction in response to said pulses causing a residual of potential to appear in said network after operation of said discharge which residual of potential increases over a series of said pulses, and means to prevent such increase of potential, said means comprising a secondary winding included in said transformer for producing a potential responsive to said residual, and means responsive to said potential to disable said discharge means for a period greater than the interval between pulses and sufficient to permit normal voltage on said network to be restored before said network is again discharged by said discharge means.

5. A pulse-generating system for supplying pulses of energy to a load having a normal impedance value, but subjection to abnormal reductions in value comprising a pulse-forming network coupled to said load, means for charging said network to a potential of one polarity, means for discharging said network in response to each of a series of control pulses, said network normally being substantially completely discharged thereby, but retaining a residual charge of a polarity opposite to said one polarity in the presence of said abnormal value of impedance of said load, a translating stage coupled to said discharge means for applying control pulses thereto, a unidirectionally conductive device coupled to said network and responsive substantially only to said residual charge for deriving a unidirectional potential, an energy-storage circuit coupled to said unidirectionally conductive device for developing a charge potential in response to said unidirectional potential and having a discharge period corresponding to the occurrence of a predetermined number of said series of pulses, and means for coupling said storage circuit to said translating stage to disable said stage in response to said charge potential and thereby prevent discharge of said network by said discharge means in the presence of said abnormal impedance value.

6. A pulse-generating system for supplying pulses of energy to a load having a normal impedance value, but subject to abnormal reductions in value comprising a pulse-forming network coupled to said load, means for charging said network to a potential of positive polarity relative to a plane of reference polarity, means for discharging said network in response to each of a series of control pulses, said network normally being substantially completely discharged thereby, but retaining a residual charge of a negative polarity in the presence of said abnormal value of impedance of said load, a translating stage coupled to said discharge means for applying control pulses thereto, a rectifier circuit including a diode having a cathode coupled to said network and an anode and including a conductive impedance extending between said anode and said reference plane, said diode being conductive substantially only in response to said residual charge to derive a unidirectional potential at said impedance, a storage condenser coupled to said impedance for developing a charge potential in response to said unidirectional potential and having a discharge period corresponding to the occurrence of a predetermined number of said series of pulses, and means for coupling said storage circuit to said translating stage to disable said stage in response to said charge potential and thereby prevent discharge of said network by said discharge means in the presence of said abnormal impedance value.

7. A pulse-generating system for supplying pulses of energy to a load having a normal impedance value, but subject to abnormal reductions in value comprising a pulse-forming network coupled to said load, a source of potential for charging said network to a potential of one polarity, a transformer including a primary winding interposed in series relation between said charging means and said network and operative to cause said network to charge to a potential greater than that of said source and including a secondary winding, means for discharging said network in response to each of a series of control pulses, said network normally being substantially completely discharged thereby, but retaining a residual charge of a polarity opposite to said one polarity in the presence of said abnormal value of impedance of said load, a translating stage coupled to said discharge means for applying control pulses thereto, a unidirectionally conductive device coupled to said secondary winding of said transformer and responsive substantially only to potentials therefrom resulting from said residual charge for deriving a unidirectional potential, an energy-storage circuit coupled to said unidirectionally conductive device for developing a charge potential in response to said unidirectional potential and having a discharge period corresponding to the occurrence of a predetermined number of said series of pulses, and means for coupling said storage circuit to said translating stage to disable said stage in response to said charge potential and thereby prevent discharge of said network by said discharge means in the presence of said abnormal impedance value.

References Cited in the file of this patent

UNITED STATES PATENTS

| | | |
|---|---|---|
| 2,415,302 | Maxwell | Feb. 4, 1947 |
| 2,438,962 | Burlingame | Apr. 6, 1948 |
| 2,469,174 | Okrent | May 3, 1949 |
| 2,469,977 | Morrison | May 10, 1949 |
| 2,496,980 | Blumlein | Feb. 7, 1950 |
| 2,510,167 | Boothroyd | June 6, 1950 |
| 2,530,096 | Sudman | Nov. 14, 1950 |